UNITED STATES PATENT OFFICE.

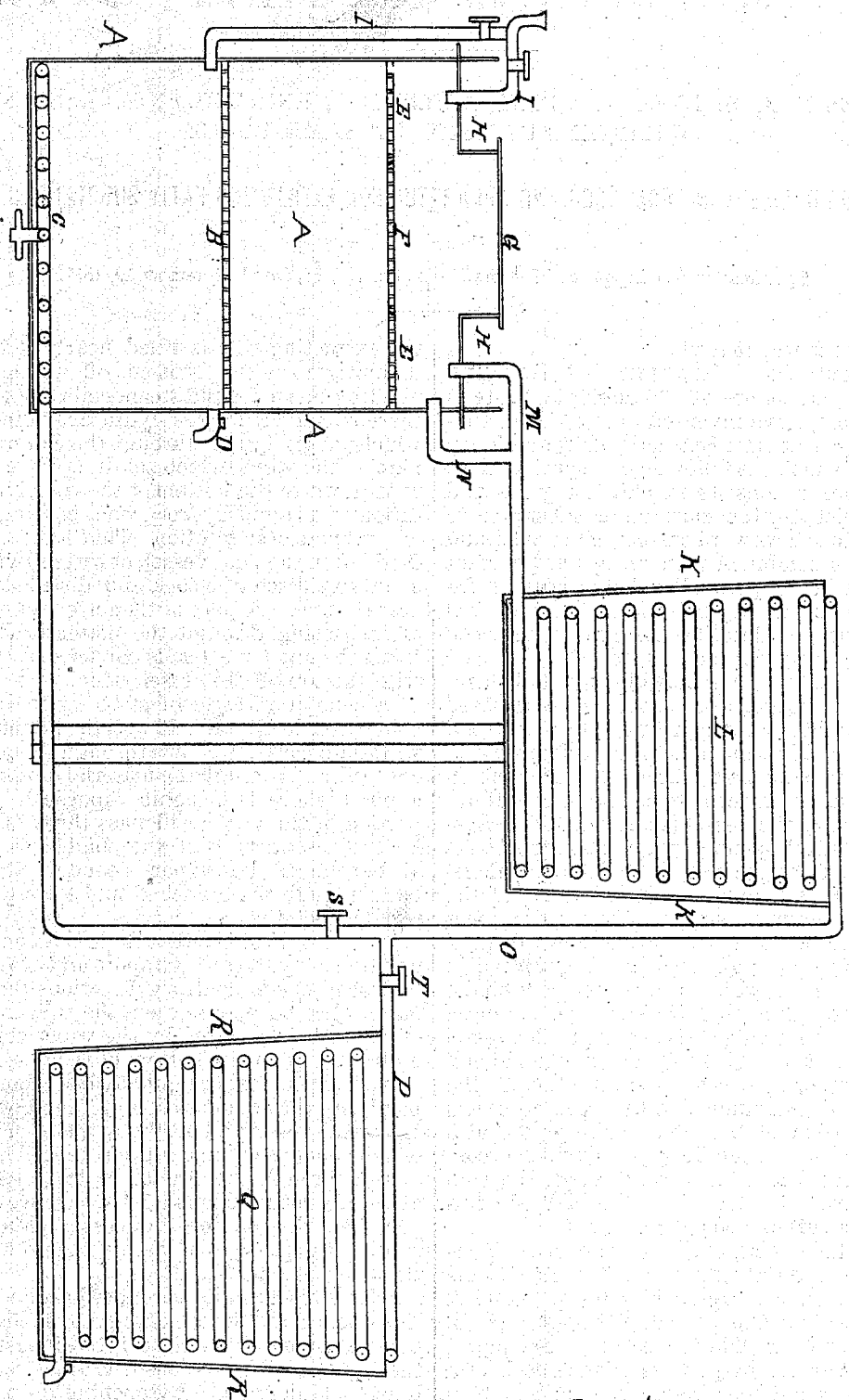

CHARLES F. A. SIMONIN, OF PHILADELPHIA, PENNSYLVANIA, ASSIGNOR TO WILLIAM ADAMSON, OF SAME PLACE.

IMPROVEMENT IN PROCESSES AND APPARATUS FOR EXTRACTING FATTY SUBSTANCES.

Specification forming part of Letters Patent No. 119,188, dated September 19, 1871.

*To all whom it may concern:*

Be it known that I, CHARLES F. A. SIMONIN, of the city and county of Philadelphia, State of Pennsylvania, have invented an Improved Process and Apparatus for Extracting Oily and Fatty Matters, of which the following is a specification:

My invention consists in extracting oils and fats by subjecting the material or substance to be treated to a downward current of heated liquid hydrocarbon combined with an upward current of hydrocarbon vapors, all substantially as described hereafter. My invention further consists of apparatus fully described hereafter wherewith to carry my invention into effect.

In the accompanying drawing, which forms a part of this specification, A represents a closed vessel, in which are comprised both a still and extractor; and in this vessel is a perforated diaphragm, B, for supporting the material from which the oily or fatty matter is to be extracted. Nearer to the top of the vessel is another diaphragm having a central opening, to which is fitted a detachable perforated cover, F. G is the manhole-cover, and H is a tank formed on the top of the vessel for receiving a supply of water, the object of which will be rendered apparent hereafter. I is a charging-pipe; K, a condensing-tank, containing a worm, L, which communicates with the vessel A through a pipe, M, this pipe having a branch, N, also communicating with the vessel A, the purport of which will be explained hereafter. A pipe, O, forms a continuation of the worm L, and communicates with the vessel A, near the bottom of the same. The pipe O also communicates with another pipe, P, which is continued in the form of a worm through the condensing-vessel R. The pipes O and P are furnished with suitable cocks S and T.

The manhole being open and the plate F removed, the material from which the fat or oil is to be extracted is introduced into the vessel A so as to rest on the perforated diaphragm B. The vessel is then charged, through the pipe I with hydrocarbon, by preference such as is of a volatile character—for instance, naphtha, benzine, benzole, or gasoline. The liquid hydrocarbon flows through the perforated cover E onto the material below, through which it percolates and finally passes through the lower perforated diaphragm B to the bottom of the vessel. When the gauge-cock D indicates that the portion of the extracting-still is filled nearly to the lower diaphragm the supply is cut off, and heat is applied by means of the steam-coil C or otherwise, thereby converting the hydrocarbon into vapor, which passes upward through the material. That part of the vapor which takes up the oil or fat runs down to the bottom of the vessel in the condition of a liquid hydrocarbon, holding the oily or fatty matter in solution. This liquid may be redistilled in the same vessel, or withdrawn through a suitable discharge-cock and distilled in a separate vessel. A part of the uncondensed vapor, after passing through the material which contains the fatty matter, is condensed by contact with the top of the vessel, which is maintained in a comparatively cool state by the supply of cold water in the tank H, and the liquefied vapor will again pass downward through the perforated cover E and through the material until it reaches a point where it is again vaporized. Another portion of the vapor will pass through the pipe M into the worm L of the condenser K, where all but the gasoline vapor is condensed, and runs back through the branch N and through the material as before.

It will now be seen that there is a constant circulation of hydrocarbon vapors and heated liquid hydrocarbons in contrary directions through the material to be operated on, the upward current of vapor being caused by the vaporizing of the hydrocarbon on the bottom of the vessel and the downward current of liquid hydrocarbons caused partly by the condensation of the vapors at the top of the vessel and partly by the return of some of the condensed vapors from the coil in the condenser through the branch N, this branch pipe affording ready means of discharging these vapors from the coil into the vessel without interrupting the passage of vapors from the vessel A through the pipe N.

When it is desired to produce gasoline the cock T is opened and the cock S closed, so that the vapors not condensed in the coil L will pass through the coil Q in the condenser R and become gasoline of a high grade. By opening the cock S and closing the cock T this vapor may be returned with the liquid hydrocarbon directly from the coil L to the bottom of the vessel A.

A steam-jacket may, if preferred, be substituted for the steam-coil C; or any other appropriate means of applying heat to the vessel may be employed. Slats, gratings, or other equivalent devices may also be substituted for the perforated diaphragms.

Without confining myself to the specific form of apparatus, I claim—

1. The within-described process of extracting fatty and oily matters by subjecting the materials to be treated to a downward current of liquid hydrocarbon combined with an upward current of hydrocarbon vapor.

2. The combination, with an extracting-still, of a cold-water reservoir, H, by which a portion of the vapor is condensed and directed onto the material.

3. A vaporizer and extractor comprised in one vessel, in combination with a condensing-tank, L, and a coil or worm communicating with the vessel, substantially as set forth.

4. The vapor-pipe M and branch pipe N, both pipes communicating with the vessel and the worm, as and for the purpose set forth.

5. The combination of the vaporizing and extracting-vessel, the condenser K and second condenser R, and communicating pipes.

CHS. F. A. SIMONIN.

Witnesses:
M. F. WALTON,
WM. R. WRIGHT.